United States Patent
Lidgi et al.

(10) Patent No.: US 12,395,503 B2
(45) Date of Patent: Aug. 19, 2025

(54) SYSTEM AND METHOD FOR DETECTING SENSITIVE DATA IN ACTIVE INSPECTION OF CLOUD COMPUTING RESOURCES

(71) Applicant: Wiz, Inc., New York, NY (US)

(72) Inventors: Matilda Lidgi, Tel Aviv (IL); Shai Keren, Tel Aviv (IL); Raaz Herzberg, Tel Aviv (IL); Avi Tal Lichtenstein, Tel Aviv (IL); Ami Luttwak, Binyamina (IL); Roy Reznik, Tel Aviv (IL)

(73) Assignee: Wiz, Inc., New York, NY (US)

( * ) Notice: Subject to any disclaimer, the term of this patent is extended or adjusted under 35 U.S.C. 154(b) by 344 days.

(21) Appl. No.: 18/146,670

(22) Filed: Dec. 27, 2022

(65) Prior Publication Data
US 2024/0214398 A1    Jun. 27, 2024

(51) Int. Cl.
*H04L 9/40* (2022.01)

(52) U.S. Cl.
CPC ................... *H04L 63/1416* (2013.01)

(58) Field of Classification Search
CPC ............. H04L 63/1416; H04L 63/1433; H04L 63/101; H04L 63/1441; H04L 63/20; H04L 63/14; G06F 21/577; G06F 21/00; G06F 2221/034; G06F 2221/033
See application file for complete search history.

(56) References Cited

U.S. PATENT DOCUMENTS

| 10,574,675 | B2 | 2/2020 | Peppe et al. |
| 2020/0389469 | A1 | 12/2020 | Litichever et al. |
| 2022/0067204 | A1* | 3/2022 | Hadar .................... G06N 20/00 |

* cited by examiner

*Primary Examiner* — Olugbenga O Idowu
(74) *Attorney, Agent, or Firm* — M&B IP Analysts, LLC

(57) ABSTRACT

A system and method for performing active inspection of a cloud computing environment to detect exposed sensitive data. The method also includes receiving at least one network path to access a first resource, where the first resource is a cloud object deployed in the cloud computing environment, and potentially accessible from a network which is external to the cloud computing environment; and generating a first instruction to access the first resource based on a plurality of reachability parameters designated in the at least one network path; causing execution of the generated first instruction to access the first resource; receiving an output, the output generated in response to execution of the generated first instruction; detecting in the output a predetermined sensitive data indicator; and initiating a mitigation action in response to detecting the sensitive data indicator in the output.

23 Claims, 8 Drawing Sheets

SYSTEM AND METHOD FOR DETECTING SENSITIVE DATA IN ACTIVE INSPECTION OF CLOUD COMPUTING RESOURCES

TECHNICAL FIELD

The present disclosure relates generally to exposure detection in cloud environments, and specifically to active detection of exposure in cloud environments.

BACKGROUND

External attack surface management (EASM) is a term which for a technology field and best practices which are utilized in cybersecurity to describe what vulnerabilities an organization has within their network infrastructure, which may include cloud computing environments, local network environments, and the like. For example, an organization may have a virtual private cloud (VPC) implemented in Amazon® Web Services (AWS), Microsoft® Azure, Google® Cloud Platform (GCP), and the like, which serves as a cloud computing environment. The cloud computing environment may include a plurality of workloads, such as virtual machines, container engines, serverless functions, and the like, any of which may pose a security risk, for example by having a vulnerability, allowing an attacker to infiltrate the organization's network in an unintended manner.

EASM technologies aim to discover where an organization is vulnerable, in order for a network administrator to secure the discovered vulnerabilities. For example, discovering an out-of-date operating system (OS) having a known vulnerability running on a virtual machine may require the network administrator to update the OS version, or apply a software patch, in order to address the vulnerability. This is also known as minimizing the external attack surface.

One such technology which may be deployed in order to discover the external attack surface is known is active scanning. Active scanning attempts to infiltrate a network (e.g., access resources in the above mentioned VPC). For example, by sending packets to endpoints in the network. Thus, an active scanner may attempt to access random domains, at random ports, in order to gain access to a network or to a network resource.

This method has some serious drawbacks. For example, attempting to guess random domains, random ports, and the like, creates a large volume of network traffic which the target (i.e., organization's network) must deal with. This may congest the network, and further risks malfunctions, such as a denial of service to other clients, data corruption from incompatible queries, and the like. It is often of upmost importance to an organization to keep a production environment in a fully operational state. Therefore, using an active scanner to test accessibility of an active production environment may be detrimental to this objective, since it would require devotion of substantial resources at least in terms of network bandwidth to perform such tests.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for performing active inspection of a cloud computing environment to detect exposed sensitive data. The method comprises: receiving at least one network path to access a first resource, where the first resource is a cloud object deployed in the cloud computing environment, and potentially accessible from a network which is external to the cloud computing environment; and generating a first instruction to access the first resource based on a plurality of reachability parameters designated in the at least one network path; causing execution of the generated first instruction to access the first resource; receiving an output, the output generated in response to execution of the generated first instruction; detecting in the output a predetermined sensitive data indicator; and initiating a mitigation action in response to detecting the sensitive data indicator in the output.

Certain embodiments disclosed herein also include a non-transitory computer readable medium having stored thereon causing a processing circuitry to execute a process, the process comprising: receiving at least one network path to access a first resource, where the first resource is a cloud object deployed in the cloud computing environment, and potentially accessible from a network which is external to the cloud computing environment; and generating a first instruction to access the first resource based on a plurality of reachability parameters designated in the at least one network path; causing execution of the generated first instruction to access the first resource; receiving an output, the output generated in response to execution of the generated first instruction; detecting in the output a predetermined sensitive data indicator; and initiating a mitigation action in response to detecting the sensitive data indicator in the output.

Certain embodiments disclosed herein also include a system for performing active inspection of a cloud computing environment to detect exposed sensitive data. The system comprises: a processing circuitry; and a memory, the memory containing instructions that, when executed by the processing circuitry, configure the system to: receive at least one network path to access a first resource, where the first resource is a cloud object deployed in the cloud computing environment, and potentially accessible from a network which is external to the cloud computing environment; and generate a first instruction to access the first resource based on a plurality of reachability parameters designated in the at least one network path; cause execution of the generated first instruction to access the first resource; receive an output, the output generated in response to execution of the generated first instruction; detect in the output a predetermined sensitive data indicator; and initiate a mitigation action in response to detecting the sensitive data indicator in the output.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
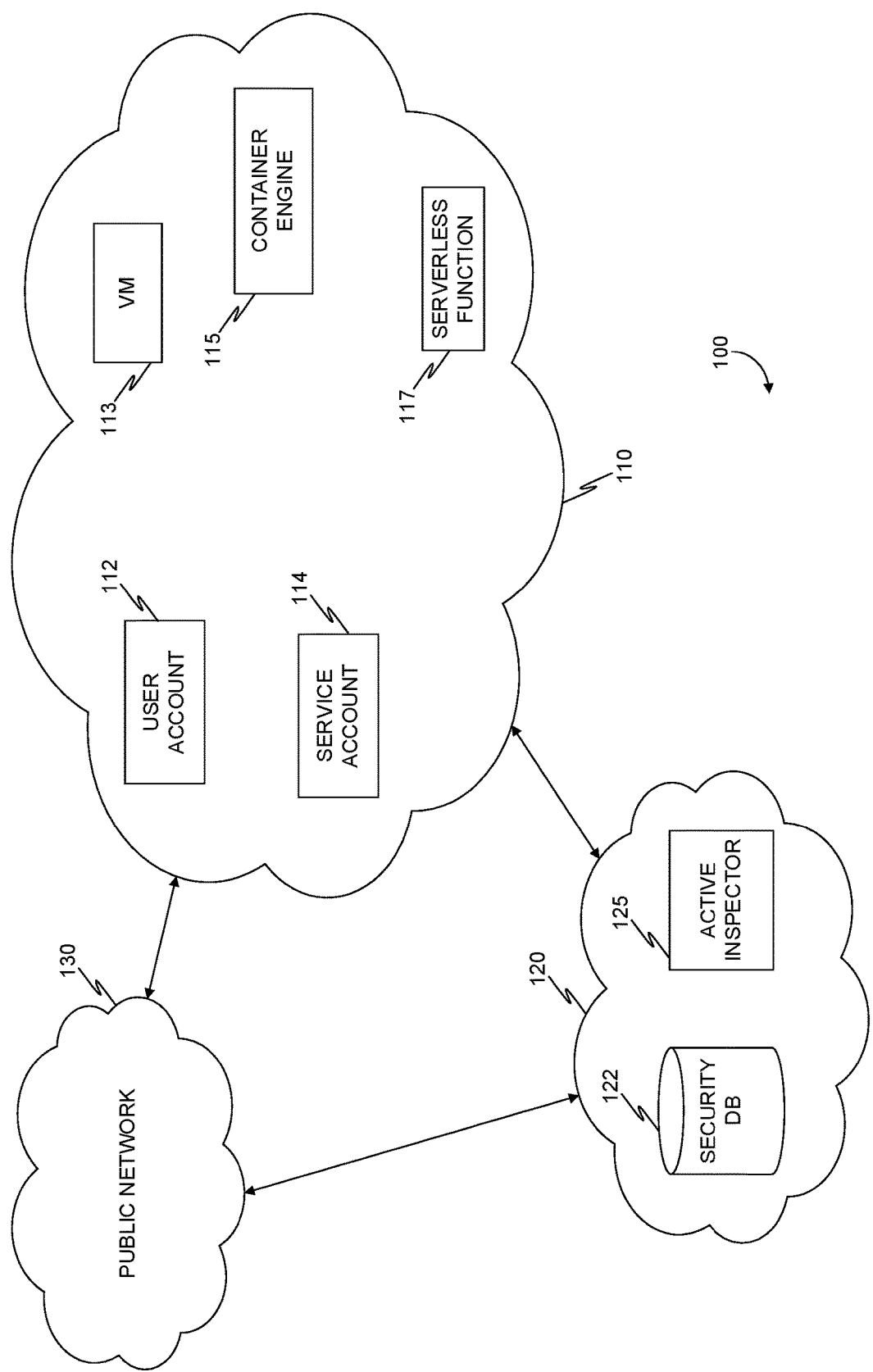
FIG. 1 is a diagram of a cloud computing environment monitored by an active inspector, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and method for performing active inspection of a cloud computing environment includes receiving at least one network path to access a first resource, wherein the first resource is a cloud object deployed in the cloud computing environment, and potentially accessible from a network which is external to the cloud computing environment; and actively inspecting the at least one network path to determine if the first resource is accessible through the at least one network path from a network external to the cloud computing environment.

Various techniques of static analysis can be used in order to determine reachability properties of a resource deployed in a cloud computing environment. Reachability properties, or parameters, may be utilized to establish a network path to the resource from an external network through the cloud computing environment. An access instruction may be generated based on the network path to determine if a network path generated through static analysis is indeed a viable path to reach the resource. Determining what network paths are viable is advantageous as it exposes what network paths can be used to access the cloud computing environment from external networks, and therefore what parts of the cloud computing environment are in practice opened to attack. These network paths should be addressed by system administrators as early as possible to minimize the effect of a cyber-attack.

In some embodiments, a resource which is actively inspected returns a response which includes data. In certain embodiments, an active inspector is configured to determine if the data is sensitive data. Where the data is sensitive data, the active inspector is further configured, according to some embodiments, to initiate a mitigation action. Detecting sensitive data exposed through an accessible resource is advantageous as it allows to perform a mitigation action which prevents the sensitive data exposure, thus reducing a cloud computing environment's overall exposure to cybersecurity risk.

FIG. 1 is an example diagram 100 of a cloud computing environment monitored by an active inspector, implemented in accordance with an embodiment. A first cloud environment 110 includes a plurality of principals and resources. A resource is a cloud entity which supplies functionality, such as processing power, memory, storage, communication, and the like. A resource may supply more than one functionality. Resources may include, for example, virtual machines (VMs) such as VMs 113, container engines such as container engines 115, serverless functions such as serverless functions 117, and the like. A VM may be implemented using Oracle® VirtualBox. A container engine may be implemented using Kubernetes® or Docker®. A serverless function may implemented using Lambda®.

A principal is a cloud entity which acts on a resource, meaning it can request, or otherwise initiate, actions or operations in the cloud environment which cause a resource to perform a function. A principal may be, for example, a user account such as user account 112, a service account such as service account 114, a role, and the like. In an embodiment a user account 112 is implemented as a data structure which includes information about an entity, such as username, a password hash, an associated role, and the like.

The first cloud environment 110 may be implemented utilizing a cloud infrastructure, such as Amazon® Web Services (AWS), Microsoft® Azure, Google® Cloud Platform (GCP), and the like. In an embodiment, the first cloud environment 110 may be implemented as a virtual private cloud (VPC) on such a cloud infrastructure. The first cloud environment 110 may be, for example, a production environment for an organization. A production environment is a computing environment which provides services, for example, to client devices within the production environment and outside of it. An organization may also have a staging environment, which is a computing environment substantially identical to the production environment in at least some deployments of resource (e.g., workloads) which is used for the purpose of testing new policies, new permissions, new applications, new appliances, new resources, and the like, which are not present in the production environment.

It is often of upmost importance to an organization to keep the production environment in a fully operational state. Therefore, using an active scanner to test accessibility to the first cloud environment 110 may be detrimental to this objective, since it would require devotion of substantial resources at least in terms of network bandwidth to perform such tests.

An inspection environment 120 is communicatively connected with the first cloud environment 110, and a public network 130. The public network 130 is also communicatively connected with the first cloud environment 110. In an embodiment, the public network 120 may be, but is not limited to, a wireless, cellular or wired network, a local area network (LAN), a wide area network (WAN), a metro area network (MAN), the Internet, the worldwide web (WWW), similar networks, and any combination thereof.

The inspection environment 120 may be implemented as a VPC in a cloud infrastructure. In an embodiment, the cloud infrastructure of the inspection environment 120 may be the same cloud infrastructure as the first cloud environment 110. In some embodiments, the inspection environment may be implemented as multiple cloud environments, each utilizing a cloud infrastructure. The inspection environment includes a security graph database (DB) 122 for storing a security graph, and at least an active inspector 125.

In an embodiment, the security graph stored in the security graph DB 122 represents at least the first cloud environment 110 using a predefined data schema. For example, each resource and each principal of the first cloud environment 110 may be represented as a corresponding resource node or principal node in the security graph. The various nodes in the security graph may be connected, for example, based on policies, roles, permissions, and the like, which are detected in the first cloud environment 110. A predefined data schema may include data structures including into which values can be inputted to represent a specific cloud entity. For example, a resource may be represented by a template data structure which includes data attributes, whose values uniquely identify the resource, such as address, name, type, OS version, and the like.

The active inspector 125 is configured to receive a network path to access a resource in the first cloud environment 110. In an embodiment, a network path may be stored as a data string which includes one or more reachability parameters. Such parameters include host names, protocols, IP addresses, ports, usernames, passwords, and the like. In certain embodiments, the active inspector 125 is further configured to receive a list of network paths. The network paths may be received periodically. In certain embodiments, the active inspector 125 is also configured to generate an instruction which includes a query for the security graph, such instruction or instructions when executed by the security graph database 122 cause(s) generation of an output including one or more network paths. For example, network paths may be generated every 24 hours, while active inspection may occur once per day, once per week, once per month, and so on.

An example of a static analysis process for generating network paths, also known as determining reachability to a resource, is discussed in more detail in U.S. Non-Provisional patent application Ser. No. 17/179,135 filed on Feb. 18, 2021, the contents of which are hereby incorporated by reference herein. In an embodiment, the active inspector 125 may generate an instruction based on the network path to access the resource associated with the network path. For example, the instruction may be to send a data packet to an IP address of the resource, and receive an acknowledgement (ACK) response. The active inspector 125 may generate a log which includes, for example, the network path, the instruction sent by the active inspector 125, and any response(s) received from the resource. For example, if the active inspector 125 sends an HTTP (hypertext transfer protocol) request, a response may be a 404 error, a 403 error, 500 error, 502 error, and the like.

In an embodiment the active inspector 125 initiates active inspection of a network path to determine if a resource is accessible via the network path from a network which is external to the first cloud environment 110.

In some embodiments, the active inspector 125 is configured to detect sensitive data. For example, according to an embodiment, a response is received from a resource on which the active inspector 125 is configured to perform inspection of a network path. In an embodiment, the response is received by a web browser. In some embodiments, the response includes sensitive data. Sensitive data is, according to an embodiment, a user account identifier (e.g., user name), a password, a passphrase, a certificate, an exposed key, a certificate, combinations thereof, and the like.

In certain embodiments, the response includes a data value. In an embodiment, a security graph is queried with the data value, to determine if the data value is based on sensitive data. In some embodiments, the response includes a sensitive data indicator. In an embodiment, the sensitive data indicator includes a predetermined text, predetermined format, and the like. A predetermined text is, according to an embodiment, an identifier of a key, an identifier of a certificate, an identifier of an encryption protocol, an identifier of an account, "key", "ssh", "rsa", "certificate", "public key", a combination thereof, and the like. A predetermined format is, for example, a number of bits, a number of characters, a combination thereof, and the like.

Figure 2:
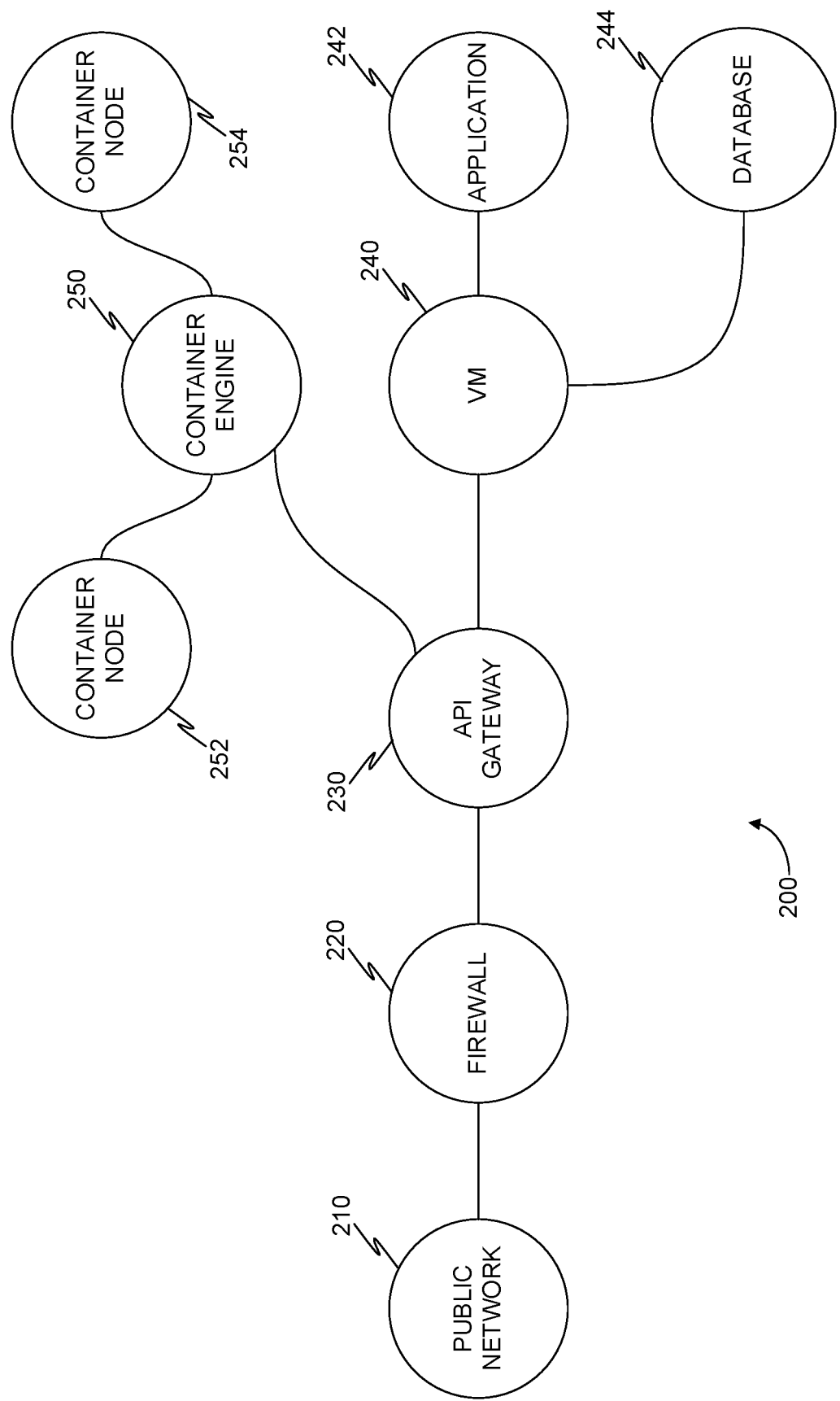
FIG. 2 is a security graph illustrating a network path, implemented in accordance with an embodiment.

FIG. 2 is an example of a security graph 200 illustrating a network path, implemented in accordance with an embodiment. The security graph 200 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 210 (also referred to as public network node 210) represents a public network, such as public network 130 of FIG. 1 above. An enrichment node, such as enrichment node 210, is a node generated based off of insights determined from data collected from a computing environment, such as the first cloud computing environment 110 of FIG. 1 above. An enrichment node may also represent, for example, a vulnerability. By connecting resource nodes in the graph to the enrichment node representing a vulnerability, the security graph 200 may indicate that the resources contain the vulnerability. This allows a compact representation as the security graph does not redundantly store multiple data fields of the same vulnerability in each resource node.

The public network node 210 is connected to a first resource node 220 (also referred to as firewall node 220) representing a firewall workload. The firewall represented by the firewall node 220 may be implemented, for example, as a virtual machine in the first cloud computing environment. Connecting the public network node 210 to the firewall node 220 represents that the firewall is open to transceiving communication between itself and the public network.

The firewall node 220 is further connected to a second resource node 230 (also referred to as API gateway node 230) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 230 is connected to a first principal node 240 (also referred to as VM node 240) representing a virtual machine hosting an application and a database, and is also connected to a second principal node 250 (also referred to as container engine node 250) which hosts a plurality of container nodes. The VM node 240 is connected to an application node 242, and a database node 244. The application node 242 may indicate, for example, that a certain application, having a version number, binaries, files, libraries, and the like, is executed on the VM which is represented by the VM node 240.

In an embodiment, the VM node 240 may be connected to a plurality of application nodes. The database node 244 represents a database which is stored on the VM (represented by VM node 240), or stored on a storage accessible by the VM. The database node 244 may include attributes which define a database, such as type (graph, columnar, distributed, etc.), version number, query language, access policy, and the like.

Figure 3:
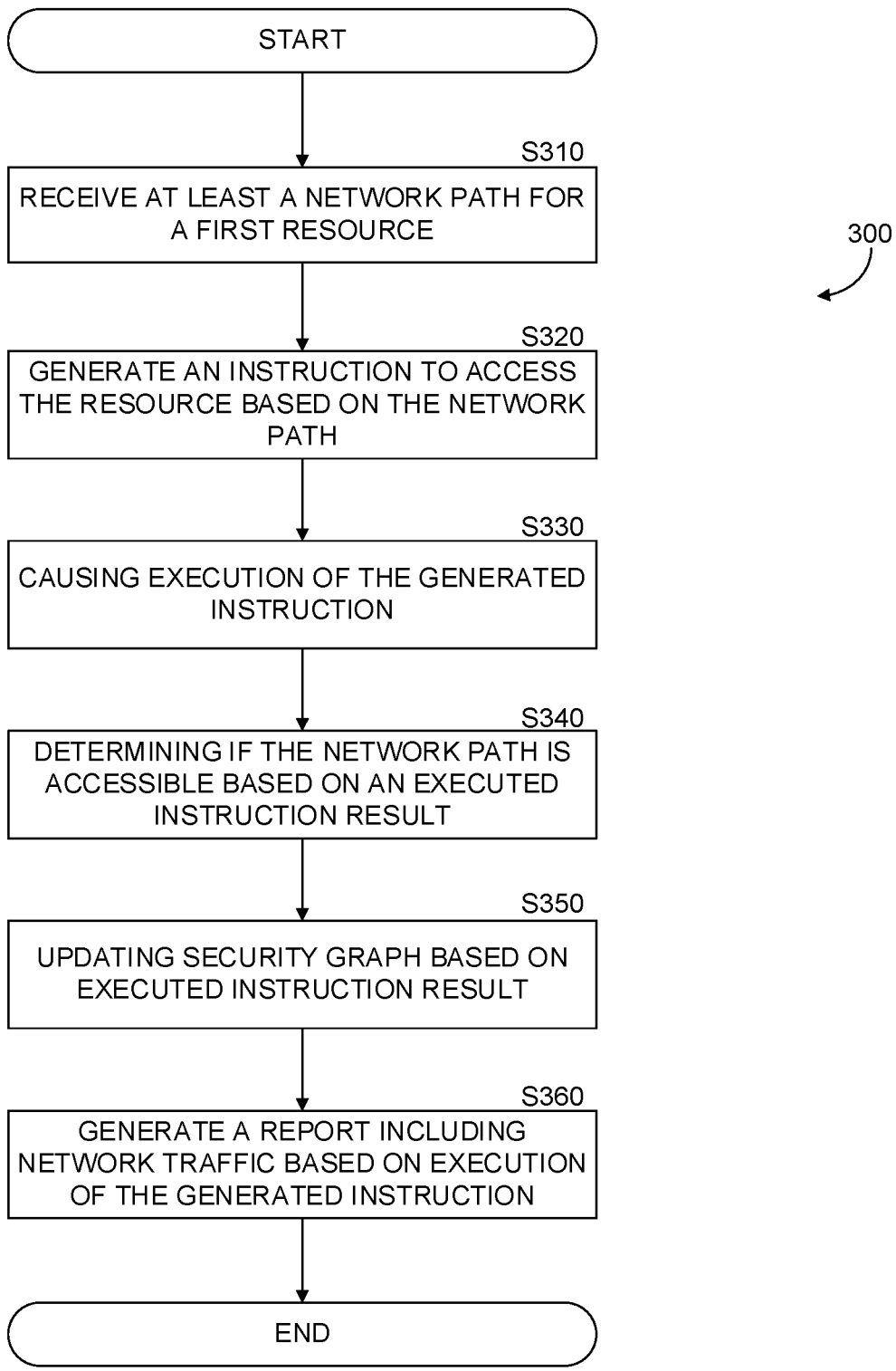
FIG. 3 is a flowchart of a method for performing active inspection of a cloud computing environment, implemented in accordance with an embodiment.

FIG. 3 is an example flowchart 300 of a method for performing active inspection of a cloud computing environment, implemented in accordance with an embodiment.

At S310, at least one network path for a first resource in a cloud computing environment is received. The network path, also known as object reachability, includes data (e.g. reachability parameters) for accessing the first resource from a public network, which is not the cloud computing environment of the first resource, such as the Internet. In an embodiment, an active inspector may receive the at least a network path, for example from a security graph. In an embodiment, S320 includes generating an instruction (or instructions) which when executed by a database system storing the security graph return a result of one or more resources, and a respective network path for each of the one or more resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is described with reference to FIGS. 4A and 4B below.

At S320, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET/bin HTTP/1.1

Host: 10.0.0.127:800 and further generate another HTTP GET request:

GET/bin HTTP/1.1

Host: 10.0.0.127:801 and so on, which when executed attempt to access a/bin folder in the resource which has an IP address of 10.0.0.127. In certain embodiments, the active inspector (e.g., the active inspector 125 of FIG. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S330, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the active inspector 125.

At S340, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S350, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S360, a report is generated based on the execution of the generated instruction. In an embodiment, the report may be generated by the active inspector, which performs this method. In certain embodiments, generating a report may include updating a log with network traffic between the active inspector and the resource. For example, the active inspector may record (e.g., write to a log) the generated instruction, the resource identifier, and a response received from the resource. A response may include, for example, a response code. A response code may indicate success, redirection, client error, server error, and the like, where the client is the active inspector, and the server is the resource. In certain embodiments the security graph stored in the security DB 122 may be updated based on the determined viability of the network paths. For example, if a resource is successfully accessed, or successfully unaccessed (i.e., an attempt was made to access the resource and the attempt was not successful in accessing the resource), this result can be stored as an attribute of a node representing the resource in the security graph. For example, the VM node 240 of FIG. 2 may have an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the active inspector may communicate with a virtual private network (VPN) or a proxy, in order to mask the IP address from which the active inspector is attempting access. This may be useful to test, for example, if a firewall, such as represented by the firewall node 220 of FIG. 2, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an active inspector using network paths generated from a security graph is advantageous, as attempting to access resources in this manner to determine the viability of a network path (i.e., reachability) requires less resources than, for example, randomly guessing network paths in an attempt to access resources.

Figure 5:
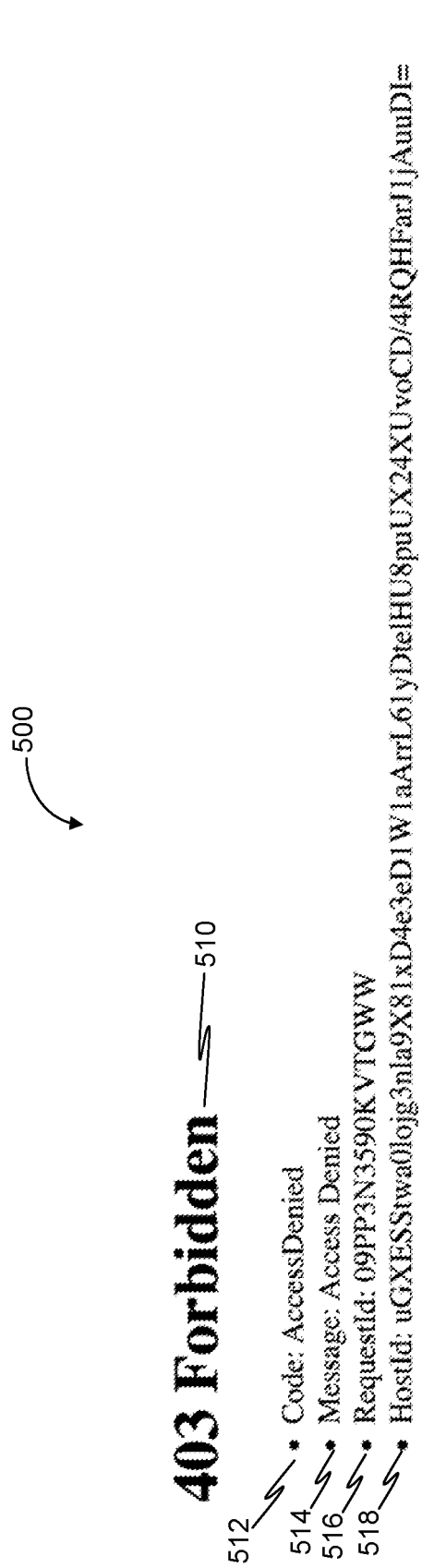
FIG. 5 is a screenshot generated by an active inspector, implemented in accordance with an embodiment.

In certain embodiments the active inspector may generate a screenshot of a user interface used to access the resource through the network path. FIG. 5 below is one such example of a screenshot of a user interface, implemented in accordance with an embodiment.

Furthermore, utilizing the active inspector to validate network paths and updating the security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addresses first.

Figure 4A:
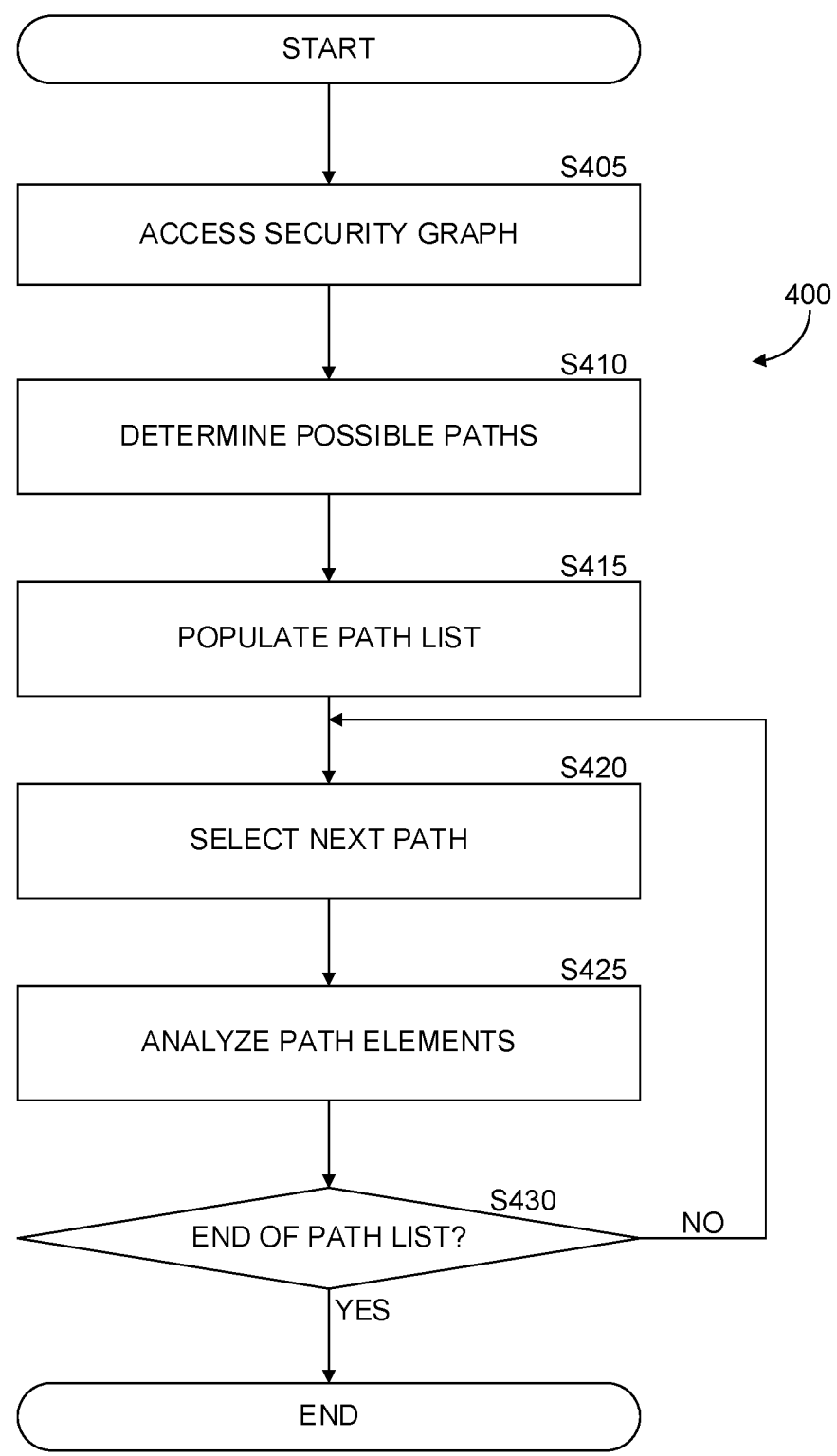
FIG. 4A is a flowchart depicting a method for determining reachable properties of security objects, according to an embodiment.

FIG. 4A is an example flowchart 400 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S405, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S410, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S410 through S430, the list of paths are iteratively identified to determine the reachability properties of the path. Specifically, at S415, a path list is populated to include all identified paths. A path list may be a table, list, or other type of data structure. A path list may be unordered or ordered, including ordering according to one or more path properties.

At S420, a path from the path list is selected. At a first run of the method a first path in the list is selected.

At S425, path elements are analyzed to determine reachable properties. Path element analysis, as at S425, is an iterative analysis of each element included in the path selected at S420. The operation of S425 is discussed in detail with reference to FIG. 4B.

At S430, it is determined whether the last path of the path list has been analyzed, and if so, execution terminates; otherwise, execution returns to S420.

Figure 4B:
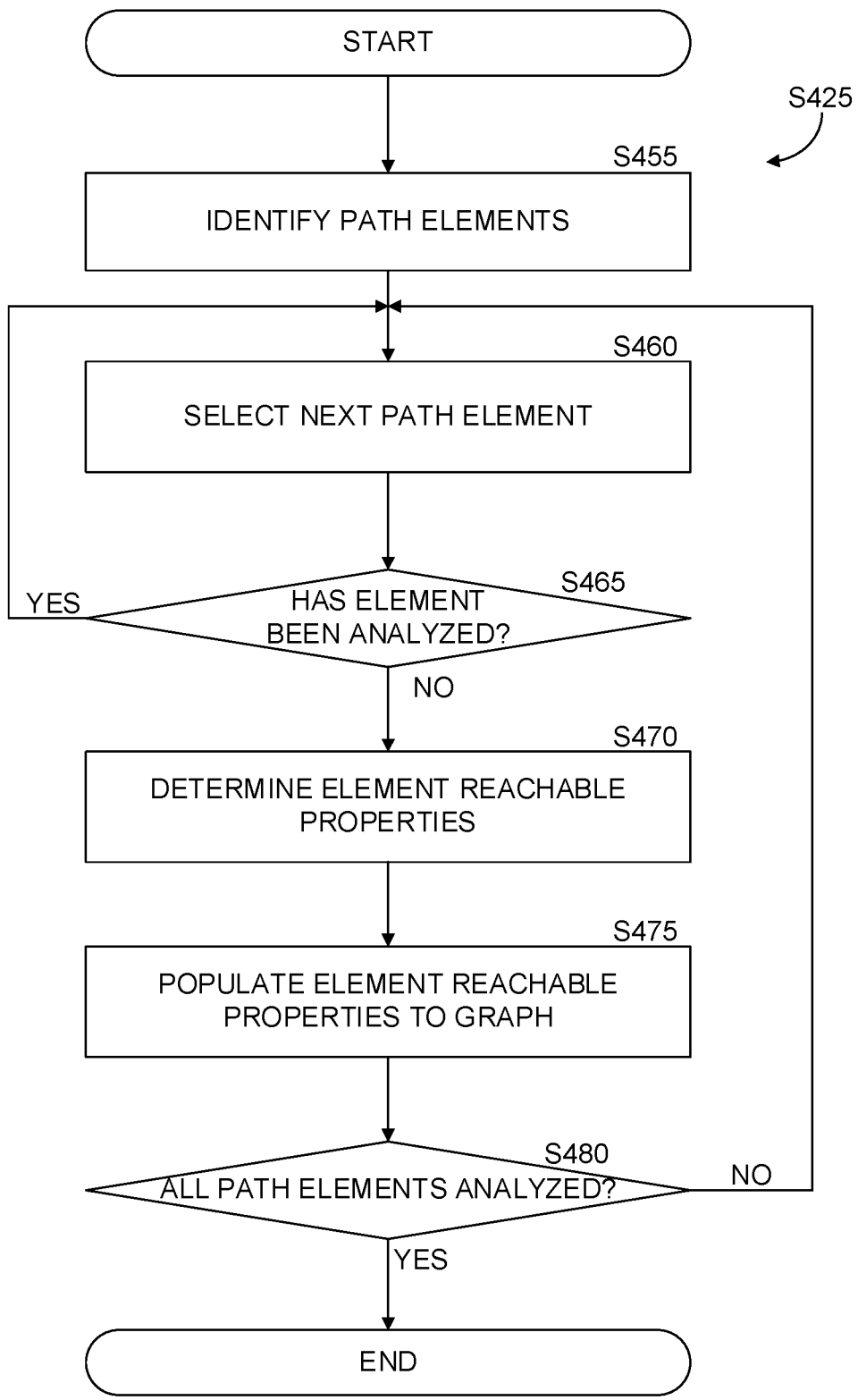
FIG. 4B is a flowchart depicting the analysis of a network path to determine reachable properties of objects included in the path, according to an embodiment.

FIG. 4B is an example flowchart S425 depicting the analysis of a network path to determine reachable properties of objects included in the path, according to an embodiment.

At S455, elements within a selected network path are identified. Elements are network and/or computing objects and relationships (or connections) between such objects. Identification of elements within the selected path may include, without limitation, identification based on properties, and other, like, data, included in the elements, identification of elements based on element identifications provided during the execution of S410 of FIG. 4A, above, and the like, as well as any combination thereof. Further, identification of in-path elements may include identification of element properties or attributes including, without limitation, names, network addresses, rulesets, port configurations, and the like, as well as any combination thereof.

Then, at S460 through S480, the list of paths are iteratively processed in order to determine reachable properties of the elements. Specifically, at S460, the next element is selected. The next element is a subsequent element of the set of elements, within the selected path, identified at S455. Where execution of S460 follows the execution of S480, the next element may be an element which, in the selected network path, immediately follows the element relevant to the preceding execution of S470 and S475. Where execution of the method described with respect to FIG. 4B includes a first execution of S460, the first execution of S460 may include the selection of a first element of the selected path.

For exemplary purposes, a network path may be a path from a virtual machine (VM), connected to a NIC, connected to a load balancer, connected to a firewall. According to a first example, where S460 is executed for the first time, the first execution of S460 may include the selection of the VM as the selected element. Further, according to a second example, where execution of S460 follows execution of S480, selection of a next element at S460 may include selection of, following the VM, selection of the NIC, or, following the NIC, selection of the load balancer, or, following the load balancer, selection of the firewall.

At S465, it is determined whether the selected element has been analyzed. Determination of whether the selected element may include the determination of whether one or more reachable properties are included in the relevant graph element. As execution of S475 provides for the population of reachable properties into the security graph, an element which does not include such reachable properties in the graph may be assumed to have not been analyzed.

Where, at S465, it is determined that the selected element has been analyzed, execution continues with S460. Where, at S465, it is determined that the selected element has not been analyzed, execution continues with S470.

At S470, reachable properties are determined. Reachable properties are object properties describing if, and how, a given path element is reachable through the selected path, and, specifically, from an external network, an internal network, both, and a combination thereof. Examples of reachable properties include, without limitation, binary properties describing whether an element is reachable, protocols by which the element is reachable, network addresses at which an element is reachable, ports by which an element is reachable, access rules, and the like, as well as any combination thereof.

In an embodiment, a reachable property is determined as a minimal set of reachable properties of all other objects in the path. As a simple example, if a path includes two objects, where one object can receive traffic from any source IP address through port 1515, and the other object can receive traffic only from a source IP address of 173.54.189.188, the reachable property of the second object may be that the second object is reachable through "source IP address 173.54.189.188 and port 1515."

At S475, reachable properties are populated into the security graph. Reachable properties, as may be determined at S470, may be populated into the graph by processes including, without limitation, labeling or tagging graph vertices (or "nodes"), updating network or graph object properties, generating one or more graph overviews, layers, or graph-adjacent data features, and the like, as well as any combination thereof.

In an embodiment, population of reachable properties into the security graph may include, for each object, population of object network access control lists (NACLs) as described hereinbelow, into the security graph elements corresponding with the various path elements, as well as the population of scope specific NACLs, and other, like, properties into the graph. Scope-specific NACLs are NACLs describing object, path, or network accessibility properties specific to a given scope, where a given scope may be the internet, various given accounts, various given environments, and the like. Scope-specific NACLs may, for example, describe the properties of an object with respect to the object's internet accessibility, where the object may be configured to include different access control properties for internet access and local intranet access.

Further, population of reachable properties into the graph may include population of one or more paths into the graph, including by population processes similar or identical to those described with respect to population of individual objects. Population of paths into the graph may include, without limitation, population of one or more paths into the graph, including a presently-analyzed path, population of one or more path properties, and the like, as well as any combination thereof. Path properties, as may be populated to a graph, are properties describing various attributes of a path, including, without limitation, NACLs applicable to path elements, path segments, or full paths, including full-path aggregate NACLs, and the like, as well as any combination thereof. Further, population of path properties into the graph may include the population of one or more scope-specific path properties, where such scope-specific path properties may be properties relevant to specific scopes, such as those described herein.

Where population of reachable properties includes labeling or tagging a graph, or elements thereof, one or more graph vertices or edges, the corresponding objects or relationships, or both, may be labeled, tagged, or otherwise associated with one or more data features describing relevant reachable properties. In addition, where population of reachable properties to the graph includes updating graph objects, graph vertices and edges, the corresponding objects and relationships, or both, may be directly updated to explicitly include the calculated properties.

Further, where population of reachable properties includes the generation of one or more graph layers or overlays, the generated graph layers or overlays may be data features independent of, but corresponding to, the relevant graphs, where the generated overlays or layers may include one or more data features describing the reachable properties of the various graph elements.

At S480, it is determined whether all elements in the selected path have been analyzed. Determination of whether all elements in the selected path have been analyzed may include, without limitation, determination of whether the immediately preceding execution of S475 relates to the last element in the selected path, determination of whether additional elements remain in the path, determination of whether any additional in-path elements have been analyzed, and the like, as well as any combination thereof.

Where, at S480, it is determined that all elements in the selected path have not been analyzed, execution continues with S460. Where, at S480, it is determined that all elements in the selected path have been analyzed, execution terminates.

FIG. 5 is an example of a screenshot 500 generated by an active inspector, implemented in accordance with an embodiment. A screenshot is an image which shows the contents of a computer display. In an embodiment, an active inspector, such as the active inspector 125 of FIG. 1, may include a web browser application for executing access instructions. The web browser application may generated a user interface intended for a display. The screenshot 500 includes a portion of such a user interface, which includes a response header 510 received based on a request to access a resource. In this case the response header 510 includes an HTTP code 403 (i.e., forbidden), meaning that the request to access the resource was denied. A detailed code 512 includes a message which is associated with the 403 code (i.e., "access denied"), a message 514, a request identifier 516, and a host identifier 518.

Figure 6:
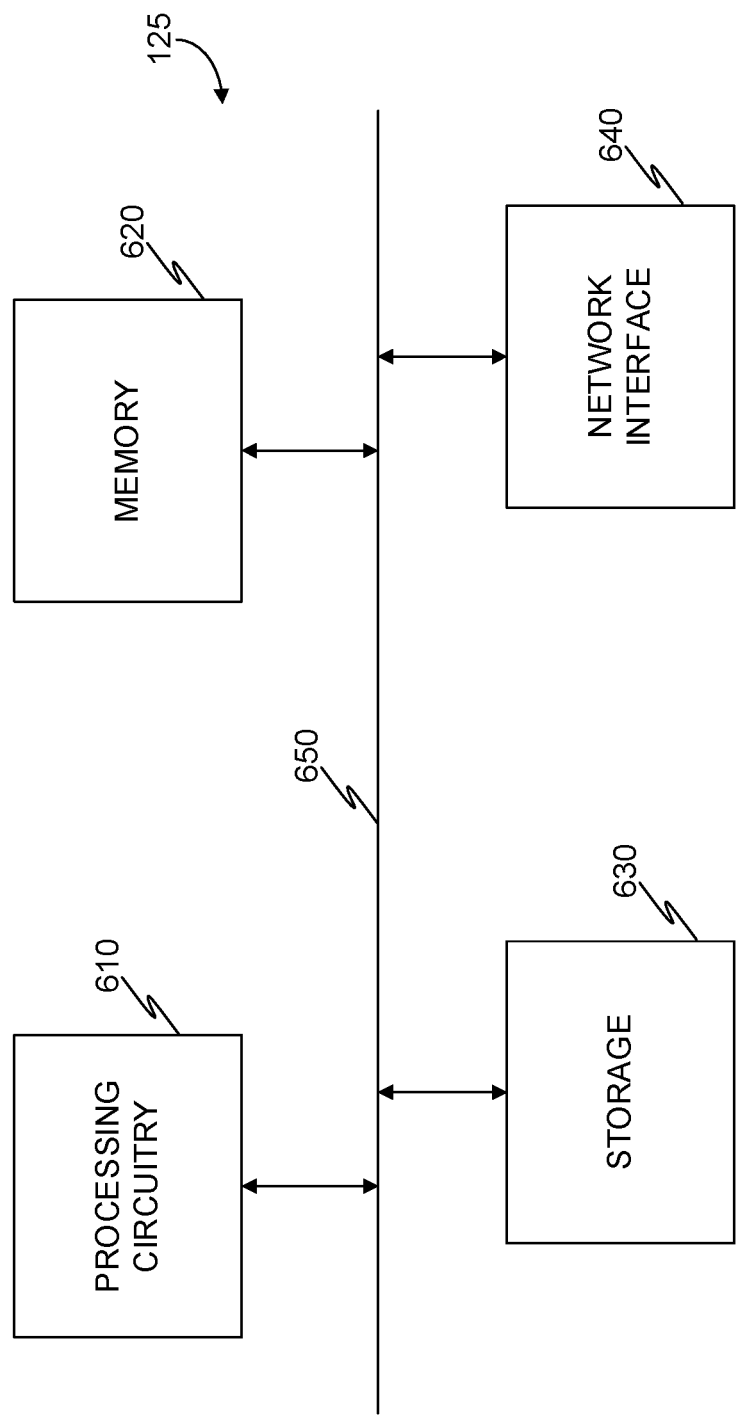
FIG. 6 is a schematic diagram of an active inspector 125 according to an embodiment.

FIG. 6 is an example schematic diagram of an active inspector 125 according to an embodiment. The active inspector 125 includes a processing circuitry 610 coupled to a memory 620, a storage 630, and a network interface 640. In an embodiment, the components of the active inspector 125 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the active inspector 125 to communicate with, for example, a cloud environment, a security graph database, resources from the cloud environment, and the like.

It should be understood that the embodiments described herein are not limited to the specific architecture illustrated in FIG. 6, and other architectures may be equally used without departing from the scope of the disclosed embodiments.

Figure 7:
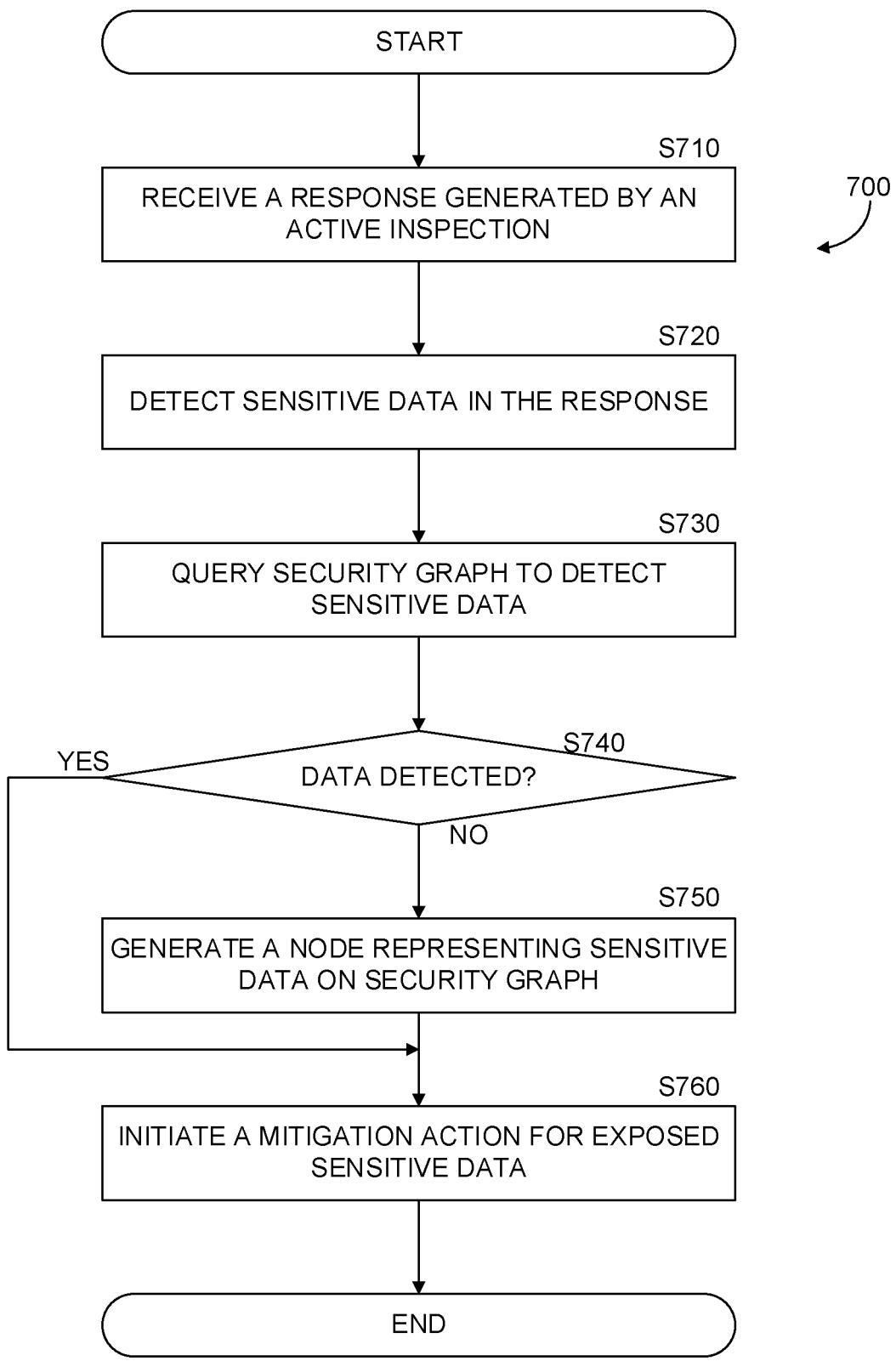
FIG. 7 is a flowchart of a method for detecting data on an exposed resource, implemented in accordance with an embodiment.

FIG. 7 is an example flowchart 700 of a method for detecting data on an exposed resource, implemented in accordance with an embodiment. In certain embodiments, active inspection of a resource generates an output including a graphical element, a text element, a combination thereof, and the like. In some embodiment, the graphical elements includes a graphical representation of text (e.g., a picture of a word), wherein the graphical element indicates exposed data. For example, a resource exposes a role identifier, a user account identifier, a service account identifier, a key, a password, a combination thereof, and the like, according to an embodiment. It is advantageous to perform active inspection and detect exposure of such sensitive data, secrets, and the like, for example in order to initiate a mitigation action which reduces the exposure, in accordance with an embodiment.

At S710, a response to an active inspection is received. In some embodiment the response includes an HTML page, an HTML header, combinations thereof, and the like. In certain embodiments the response includes a graphical element, a text element, combinations thereof, and the like. In an embodiment, the graphical element is a screenshot, a screen grab, a graphical element of an HTML page, a combination thereof, and the like. In certain embodiments the graphical element is received in response to performing active inspection on a resource, such as described in more detail above.

In some embodiments, a resource is configured to provide an output for display, such as an HTML page, a graphical element, a combination thereof, and the like. In certain embodiments the resource is misconfigured to provide a first output for display, rather than providing a second output for display, where the second output is the correct configuration.

In some embodiments, a plurality of graphical elements are received. For example, according to an embodiment an active inspector is configured to initiate a first access instruction to a resource (e.g., access a login page), and a first response is received in response to executing the first access instruction. The active inspector is further configured to initiate a second access instruction to the resource (e.g., provide login credentials to the resource), and a second response is received in response to executing the second access instruction.

At S720, sensitive data is detected in the received response. In some embodiments the response, a portion thereof, and the like, is provided to an inspector workload, which is configured, according to an embodiment, to detect a secret, sensitive data, combinations thereof, and the like.

In certain embodiments the response includes a graphical element, and optical character recognition (OCR) is performed on the graphical element of the response. In an embodiment the graphical element is provided to an OCR software module which is configured to detect text in a graphic. For example, in an embodiment an active inspector is configured to deploy an OCR software module thereon.

In some embodiments, the OCR software module is implemented as a convolutional neural network (CNN) configured to classify images to letters, and generate a textual output based on the classification. For example, a CNN is configured to detect the letter "a", and generates a textual output including the character "a" in response to the CNN classifying a graphical element as the letter "a".

In an embodiment, the OCR module is configured to generate a textual output including characters which are detected by the OCR module in the graphical element. In some embodiments, the textual output includes a plurality of text elements. A text element is, according to an embodiment, a letter, a word, a number, an alphanumeric string, an integer, a special character, a combination thereof, and the like.

In some embodiments, the OCR module is further configured to detect a format of the textual output. For example, a format is, according to an embodiment, a length of an alphanumeric string, a size of an alphanumeric string, an identifier of an alphanumeric string, a combination thereof, and the like. In an embodiment, a length of an alphanumeric string is a predefined number of characters. In certain embodiments, a size of an alphanumeric string is a number of bits (e.g., 256 bits), and in some embodiments an identifier of an alphanumeric string is, for example "ssh", "rsa", "user", "user name", "account", "password", combinations thereof, and the like.

In certain embodiments, a format is, for example, a number of bits, a number of characters, a combination thereof, and the like. In some embodiments, the OCR output (i.e., the textual output of the OCR software module) is parsed into text elements. In an embodiment, each text element is compared to a predetermined text, a predetermined format, a combination thereof, and the like.

In an embodiment, the OCR software module (or OCR module) is deployed as a software application on a workload, such as the active inspector 125 of FIG. 1 above. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

In some embodiments, a match is generated between the textual output of the OCR software module and the predetermined text, the predetermined format, a combination thereof, and the like. For example, in an embodiment the textual output, a portion thereof (i.e., a text element), and the like, match a predetermined text if the comparison indicates that the textual output and the predetermined text are identical. In some embodiments, the predetermined text and the textual output are determined to be a match if the predetermined text and the textual output are similar within a threshold.

For example, in an embodiment, a textual output is "ssn-rsa" and the predetermined text is "ssh-rsa". In this example, the textual output is determined to match the predetermined text within the threshold. In some embodiments, a language processing technique, such as a natural language processing (NLP) technique (e.g., Word2Vec) is utilized to determine the match between the textual output and the predetermined text. For example, a distance is determined between the text element and the predetermined text using an NLP technique. Where the distance is below a predetermined threshold, the text element and the predetermined text are considered a match.

At S730, a security graph is queried based on the detected sensitive data. In an embodiment, a query is generated based on the detected sensitive data, which is provided for execution by a graph database hosting therein a security graph representing a cloud computing environment, including a node representing a resource on which active inspection is performed. For example, in an embodiment the sensitive data is a secret, such as a cloud key. The security graph is queried to detect a node representing the cloud key.

At S740, a check is performed to determine if the sensitive data is represented by the security graph. If the sensitive data is not represented in the security graph (e.g., no node was detected which matches the cloud key), execution continues at S750, according to an embodiment. If the sensitive data is represented in the security graph (e.g., a node is detected which matches the cloud key), execution continues at S760, according to an embodiment.

At S750, a node representing the sensitive data is generated in the security graph. In an embodiment, the security graph includes a node representing a resource on which active inspection is performed. For example, where the resource is an Amazon® Lambda® serverless function, and the sensitive data is a cloud key, a node representing the cloud key is generated, which is connected to a node representing the serverless function. This indicates that the secret is associated with the instance of the serverless function.

At S760, a mitigation action is initiated. In an embodiment, a mitigation action includes generating an instruction which when executed configures a resource to perform the mitigation action. In some embodiments the mitigation action includes generating a notification, an alert, a combination thereof, and the like, to indicate that sensitive data is exposed on a resource which active inspection has proven to be exposed. In some embodiments, the mitigation action includes increasing a severity of a previously generated alert corresponding to the resource. For example, in response to determining that an exposed resource includes exposed sensitive data, an alert previously generated for the resource based on determining that the resource is exposed is increased from "medium" to "severe".

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for performing active inspection of a cloud computing environment to detect exposed sensitive data, comprising:
   receiving at least one network path to access a first resource, wherein the first resource is a cloud object deployed in the cloud computing environment, and potentially accessible from a network which is external to the cloud computing environment; and
   generating a first instruction to access the first resource based on a plurality of reachability parameters designated in the at least one network path;
   causing execution of the generated first instruction to access the first resource;
   receiving an output, the output generated in response to the execution of the generated first instruction;
   determining that the output includes a graphical output;
   performing optical character recognition (OCR) on the graphical output to generate a textual output;
   detecting in the textual output a predetermined sensitive data indicator; and
   initiating a mitigation action in response to detecting the sensitive data indicator in the textual output.

2. The method of claim 1, further comprising:
   parsing the textual output to a plurality of text elements;
   comparing each text element to a predetermined text, the predetermined text indicating sensitive data; and
   determining that a text element of the plurality of text elements is a sensitive data indicator in response to matching a text element to the predetermined text.

3. The method of claim 2, further comprising:
   matching the text element to the predetermined text based on determining a distance between the text element and the predetermined text utilizing a language processing technique.

4. The method of claim 2, wherein the predetermined text is any one of: an identifier of an encryption protocol, an identifier of a key, an identifier of a certificate, an identifier of an account, an identifier of a role, and a combination thereof.

5. The method of claim 1, further comprising:
   parsing the textual output to a plurality of text elements;
   determining a format of a text element of the plurality of text elements;
   comparing the format of the text element to a predetermined format, the predetermined format indicating sensitive data; and
   determining that the text element is a sensitive data indicator in response to matching the format to predetermined format.

6. The method of claim 5, wherein the format includes any one of: a number of bits, a number of alphanumeric characters, and a combination thereof.

7. The method of claim 1, further comprising:
   determining that the sensitive data indicator indicates sensitive data in response to detecting data in a second textual output.

8. The method of claim 7, further comprising:
   receiving a second graphical output, the second graphical output generated in response to execution of the first instruction; and
   performing OCR on the second graphical output to generate the second textual output.

9. The method of claim 1, further comprising:
   generating a node in a security graph to represent the sensitive data, wherein the security graph includes a representation of the cloud computing environment, and wherein the node is connected to a node representing the first resource.

10. The method of claim 9, further comprising:
    querying the security graph based on the sensitive data to detect a node representing the sensitive data; and
    generating the node in the security graph to represent the sensitive data in response to detecting that the sensitive data is not represented in the security graph.

11. The method of claim 1, wherein the mitigation action further includes any one of: generating an alert, generating a notification, increasing a severity of an alert, and a combination thereof.

12. A system for performing active inspection of a cloud computing environment to detect exposed sensitive data, comprising:
    a processing circuitry; and
    a memory, the memory containing instructions that, when executed by the processing circuitry, configure the system to:
    receive at least one network path to access a first resource, wherein the first resource is a cloud object deployed in the cloud computing environment, and potentially accessible from a network which is external to the cloud computing environment; and generate a first instruction to access the first resource based on a plurality of reachability parameters designated in the at least one network path;

cause execution of the generated first instruction to access the first resource;

receive an output, the output generated in response to the execution of the generated first instruction;

determine that the output includes a graphical output;

perform optical character recognition (OCR) on the graphical output to generate a textual output;

detect in the output a predetermined sensitive data indicator; and initiate a mitigation action in response to detecting the sensitive data indicator in the textual output.

13. The system of claim 12, wherein the memory contains further instructions which when executed by the processing circuitry further configures the system to:

parse the textual output to a plurality of text elements;

compare each text element to a predetermined text, the predetermined text indicating sensitive data; and determine that a text element of the plurality of text elements is a sensitive data indicator in response to matching a text element to the predetermined text.

14. The system of claim 13, wherein the memory contains further instructions which when executed by the processing circuitry further configures the system to:

match the text element to the predetermined text based on determining a distance between the text element and the predetermined text utilizing a language processing technique.

15. The system of claim 13, wherein the predetermined text is any one of: an identifier of an encryption protocol, an identifier of a key, an identifier of a certificate, an identifier of an account, an identifier of a role, and a combination thereof.

16. The system of claim 12, wherein the memory contains further instructions which when executed by the processing circuitry further configures the system to:

parse the textual output to a plurality of text elements;

determine a format of a text element of the plurality of text elements;

compare the format of the text element to a predetermined format, the predetermined format indicating sensitive data; and determine that the text element is a sensitive data indicator in response to matching the format to predetermined format.

17. The system of claim 16, wherein the format includes any one of: a number of bits, a number of alphanumeric characters, and a combination thereof.

18. The system of claim 12, wherein the memory contains further instructions which when executed by the processing circuitry further configures the system to:

determine that the sensitive data indicator indicates sensitive data in response to detecting data in a second textual output.

19. The system of claim 18, wherein the memory contains further instructions which when executed by the processing circuitry further configures the system to:

receive a second graphical output, the second graphical output generated in response to execution of the first instruction; and perform OCR on the second graphical output to generate the second textual output.

20. The system of claim 12, wherein the memory contains further instructions which when executed by the processing circuitry further configures the system to:

generate a node in a security graph to represent the sensitive data, wherein the security graph includes a representation of the cloud computing environment, and wherein the node is connected to a node representing the first resource.

21. The system of claim 20, wherein the memory contains further instructions which when executed by the processing circuitry further configures the system to:

query the security graph based on the sensitive data to detect a node representing the sensitive data; and generate the node in the security graph to represent the sensitive data in response to detecting that the sensitive data is not represented in the security graph.

22. The system of claim 12, wherein the mitigation action further includes any one of: generating an alert, generating a notification, increasing a severity of an alert, and a combination thereof.

23. A non-transitory computer readable medium having stored thereon instructions for causing a processing circuitry to execute a process, the process comprising:

receiving at least one network path to access a first resource, wherein the first resource is a cloud object deployed in the cloud computing environment, and potentially accessible from a network which is external to the cloud computing environment; and generating a first instruction to access the first resource based on a plurality of reachability parameters designated in the at least one network path;

causing execution of the generated first instruction to access the first resource;

receiving an output, the output generated in response to the execution of the generated first instruction;

determining that the output includes a graphical output;

performing optical character recognition (OCR) on the graphical output to generate a textual output;

detecting in the output a predetermined sensitive data indicator; and initiating a mitigation action in response to detecting the sensitive data indicator in the textual output.

* * * * *